United States Patent [19]

Sabre

[11] Patent Number: 4,999,109
[45] Date of Patent: Mar. 12, 1991

[54] FILTERING LID WITH SEPARATE INLET AND OUTLET COMPARTMENTS

[76] Inventor: Reza A. Sabre, 3716 N. Elm, Denton, Tex. 76201

[21] Appl. No.: 399,239

[22] Filed: Aug. 28, 1989

[51] Int. Cl.$^5$ .............................................. B01D 24/22
[52] U.S. Cl. .................................. 210/244; 210/266; 210/282; 210/501; 210/503; 210/504; 210/474
[58] Field of Search ............... 210/266, 282, 232, 284, 210/501, 503, 504, 244, 474, 482, 290

[56] References Cited

U.S. PATENT DOCUMENTS

| | | | |
|---|---|---|---|
| 1,120,229 | 12/1914 | Nieman | 210/474 |
| 1,483,498 | 12/1921 | Zolnererich | 210/244 |
| 1,834,045 | 12/1931 | Breuil | 210/282 |
| 2,171,982 | 9/1939 | Holbrook | 210/474 |
| 2,500,134 | 3/1950 | Murray | 210/282 |
| 3,223,619 | 12/1965 | Calmon et al. | 210/282 |
| 3,327,859 | 6/1967 | Pall | 210/266 |
| 3,392,837 | 7/1968 | Sanzenbacher | 210/282 |
| 3,675,776 | 7/1972 | Campo | 210/232 |
| 4,025,438 | 5/1977 | Gelman et al. | 210/503 |
| 4,151,092 | 4/1979 | Grimm et al. | 210/256 |
| 4,283,283 | 8/1981 | Zimmerman | 210/282 |
| 4,298,475 | 11/1981 | Gartner | 210/266 |
| 4,364,828 | 12/1982 | Ward | 210/282 |
| 4,389,311 | 6/1983 | La Freniere | 210/198 |
| 4,491,520 | 1/1985 | Jaye | 210/232 |
| 4,505,727 | 3/1985 | Cullen et al. | 210/483 |
| 4,605,499 | 8/1986 | Wise | 210/282 |
| 4,714,550 | 12/1987 | Malson et al. | 210/244 |
| 4,749,481 | 6/1988 | Wheatley | 210/283 |
| 4,764,274 | 8/1988 | Miller | 210/266 |
| 4,800,018 | 1/1989 | Moser | 210/282 |

Primary Examiner—Richard V. Fisher
Assistant Examiner—Cynthia L. Nessler
Attorney, Agent, or Firm—Hubbard, Thurman, Tucker & Harris

[57] ABSTRACT

A portable water filtering apparatus having a lid secureable to conventional plastic drinking cups, with a filtering element disposed with the lid. The apparatus includes inlet and outlet spouts, and may also include a drinking cup secured thereto, so that contaminated water is filtered once upon being poured through the inlet means into the cup, and filtered a second time upon being poured out of the cup through the outlet. The filtering element includes four layers of filtering material for removing particulate matter, bacteria, and unpleasant odor and taste from contaminated water.

9 Claims, 2 Drawing Sheets

FILTERING LID WITH SEPARATE INLET AND OUTLET COMPARTMENTS

FIELD OF THE INVENTION

This invention relates to portable water filters and more particularly to a filtering unit operably securable to a conventional drinking cup such that contaminated water may be filtered as the water is poured into and/or out of the attached drinking cup.

DESCRIPTION OF THE PRIOR ART

In the prior art, a variety of portable water filtering devices are disclosed, some of which include a portable container into which contaminated water may be simultaneously poured and filtered. One such device is the "filtering drinking cup" disclosed in U.S. Pat. No. 1,483,498 which issued Feb. 12, 1924 to F. Zolnerevich. The device disclosed and claimed in the '498 patent includes a filter member disposed beneath the hinged lid of a collapsible drinking cup, whereby water may be poured through the filter element into the collapsible cup. To drink the water from the collapsible cup, the hinged lid and the filter element must be removed and set aside. The Zolnerevich device is not suitable for filtering water as said water is poured out of the cup.

Other embodiments of water containers having filter elements disposed therein are set forth in U.S. Pat. Nos. 4,283,283, 4,605,499, 4,151,092, and 4,389,311. The device disclosed in the '283 patent is essentially a funnel with an activated charcoal filtering element disposed in the lower portion, with no separate container for the filtered water. The '499 discloses a filtering element disposed in the top portion of a container wherein water can be filtered once upon being poured into the container, and filtered again as it is poured out. The filtering element of the '499 patent is disposed within the upper portion of the container and is not conveniently removable with the cap as a single unit. Additionally, the filtering element of the '499 device is such that particles of sediment which are removed as water is poured into the container will be carried back out with the water as the water passes outwardly through the filter element. The devices disclosed in the '092 and '311 patents are water filtering "kits", consisting essentially of two separate containers wherein water is forced from the first container through a filtering element into the second container, with disinfectant pellets being added to destroy bacteria.

SUMMARY OF THE PRESENT INVENTION

An object of the present invention is to provide an improved portable water filtering apparatus adaptable for use with conventional plastic drinking cups and providing for simplified replacement of the filter element. An additional object of this invention is to provide a portable water filtering apparatus which, together with a drinking cup or other suitable container, allows the user thereof to simply and effectively filter water twice prior to consumption.

A further object of the present invention is to provide a portable water filtering apparatus which removes from contaminated water unpleasant odor and taste, while simultaneously destroying harmful bacteria. A still further object of the present invention is to provide a portable water filtering apparatus which is adaptable to selectively remove from contaminated water unpleasant odor and taste, unwanted bacteria, and sediment, either collectively or individually.

In accordance with the teachings of the present invention, there is disclosed herein a preferred embodiment of a portable water filtering apparatus having a filtering element disposed within a lid engageable with conventional plastic drinking cups. The unique lid of this invention includes an inlet hole, through which contaminated water may be poured to effect a first filtering thereof, and an outlet spout through which the once filtered water may be poured to effect a second filtering thereof. The lid further includes a novel divider rib which creates separate compartments for incoming and outgoing water, thus improving the efficiency of the filtering process.

As disclosed hereinbelow, the preferred embodiment of the filtering device for use in the present invention consists of four separate layers, each providing a different filtering function. It is primarily intended that all four layers be present in a single filtering unit, but it is also expected that the four layers may be separable so that any number may be used depending upon the filtering needs of the user.

These and other objects of the present invention will become apparent from the reading of the following specification, taken in conjunction with the enclosed drawings.

DETAILED DESCRIPTION OF THE PREFERRED EMBODIMENT

Figures 1, 2:
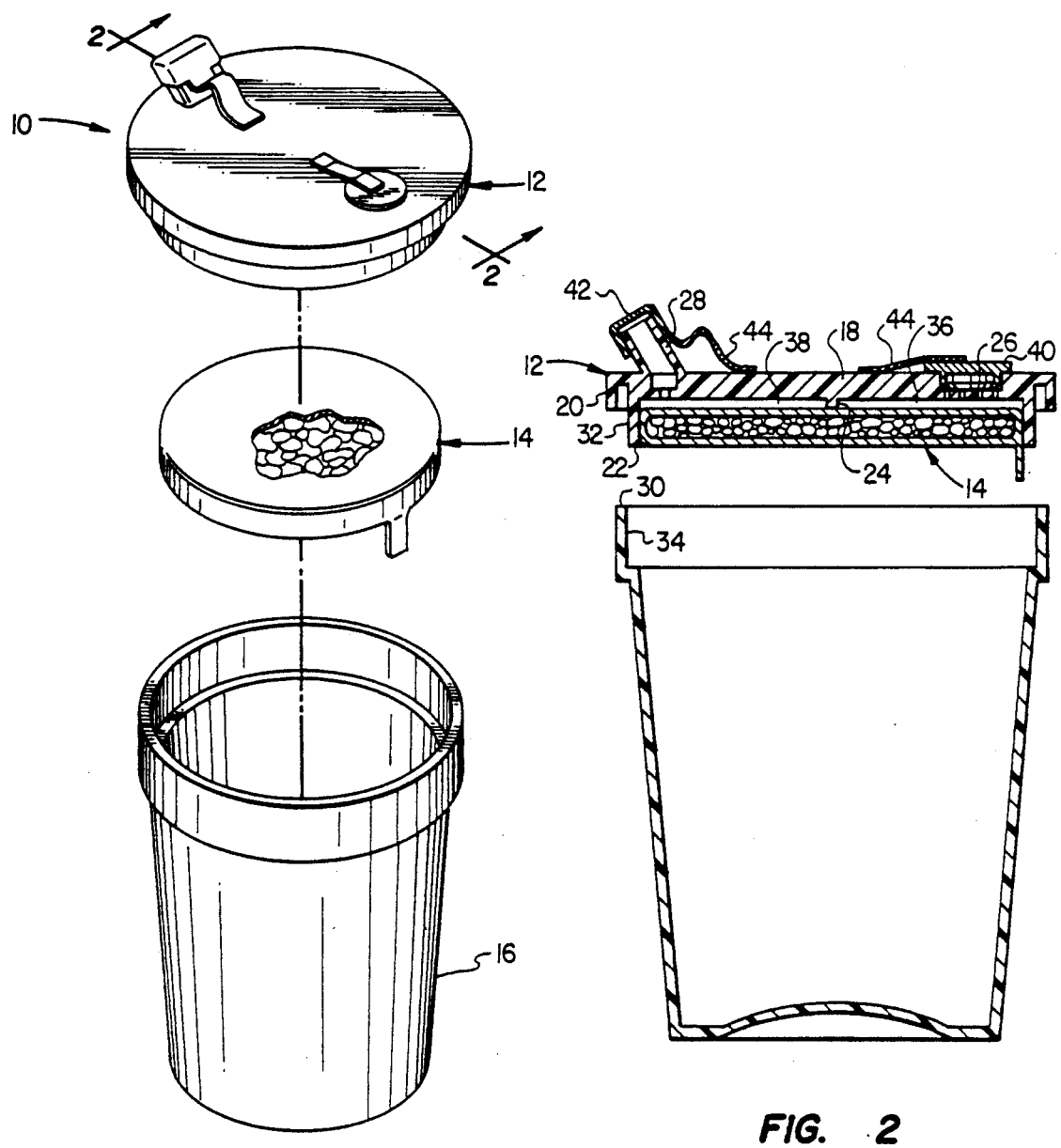
FIG. 1 is an exploded perspective view of the preferred embodiment of the present invention, with the details of the filter element being omitted.
FIG. 2 is a side cross-sectional view of the filtering apparatus of the present invention taken along line 2—2 of FIG. 1.

Referring now to FIGS. 1 and 2, the water filtering apparatus 10 of the present invention consists of lid 12 with filter element 14 being disposed therein, and cup 16. Preferably, cup 16 is an 18-24 oz. conventional plastic drinking cup as is commonly sold at football games and similar events. For example, the GRAFFI ™ cup manufactured by the Churchill Container Corp. is suitable for purposes of the present invention. The combination of lid 12 and filter element 14 may be used interchangeably with a variety of cups provided by the user. Or, alternatively, cup 16 may be supplied with apparatus 10, thereby providing the user with a suitable container while allowing the user to choose between cup 16 or any number of other suitable conventional containers. Additionally, lid 12 may be supplied in a variety of sizes suitable for use with many different commercially available cups.

Referring now to FIG. 2, lid 12 includes horizontal upper portion 18 with vertically and downwardly extending lips 20 and 22 contiguous therewith. Lid 12 also includes centrally located divider rib 24, inlet passageway 26, and outlet spout 28. Lip 20 is conventionally configured such that it will suitably engage rim 30 of cup 16. Lip 22 is dimensioned so that, when lid 12 is snapped into place on cup 16, the outer surface 32 fits snugly against upper portion 34 of the interior of cup 16.

Divider rib 24 is a slight protrusion extending diagonally along the downwardly facing surface of horizontal upper portion 18, which divides the cavity defined by the interior of lip 22 into two substantially equal compartments 36 and 38. Compartment 36 is in fluid communication with inlet passageway 26, so that contaminated water being poured into inlet passageway 26 will briefly collect within compartment 36 before passing through filter element 14 and collecting in cup 16. Similarly, compartment 38 is in fluid communication with outlet spout 28, so that water being poured from cup 16 will again pass through filter element 14 and collect in compartment 38 prior to exiting through outlets spout 28.

By maintaining separate compartments 36 and 38 for incoming and outgoing fluids, respectively, apparatus 10 provides for more effective filtering with a single filter element 14 than is known in the prior art in at least two respects. First, divider rib 24 maintains filter element 14 and horizontal upper portion 18 in a spaced apart relationship, thus allowing substantially all of the available surface area of filter element 14 to be effectively utilized for filtering. If filter element 14 were pressed flush against the lower surface of upper portion 18, only the isolated surface area of filter element 14 immediately adjacent inlet passageway 26 would be available for filtering incoming water. The inclusion of divider rib 24 results in the exposure of substantially half the total upper surface area of filter element 14 within each of compartments 36 and 38, thus allowing the incoming contaminated water to spread out within compartment 36 and soak through a much larger portion of filter element 14 than would be possible otherwise. Compartment 38 provides a similar function for water passing back through filter element and exiting through outlet spout 28.

The second significant advantage provided by divider rib 24 is that a certain amount of particulate matter will be collected on the upper surface of the portion of filter element 14 exposed within compartment 36 as the unfiltered water is poured through inlet passageway 26. If divider rib 24 did not provide separate compartments 36 and 38 for incoming and outgoing water, the outgoing water would pick-up the particulate matter deposited on the upper surface of filter element 14 and carry said particulate matter through outlet spout 28 to the user. With divider rib 24 in place, however, the upper surface of filter element 14 exposed within compartment 38 remains relatively clean as compared to the corresponding surface area in compartment 36, thus greatly improving the efficiency of the second filtering stage.

Lid 12 also includes plug 40 and cap 42 which seal inlet passageway 26 and outlet spout 28, respectively, when not in use. Plug 40 and cap 42 frictionally engage inlet passageway 26 and outlet spout 28 as shown in FIG. 2, and are easily removable by the user when desired. To prevent the accidental loss of these items, plug 40 and cap 42 are secured to upper portion 18 by means of straps 44, which may be integrally molded with plug 40 and cap 42 or secured by means of an adhesive or any other conventional method. Straps 44 are preferably composed of a strong yet flexible plastic; any number of conventional plastics currently on the market will suffice.

Figure 3:
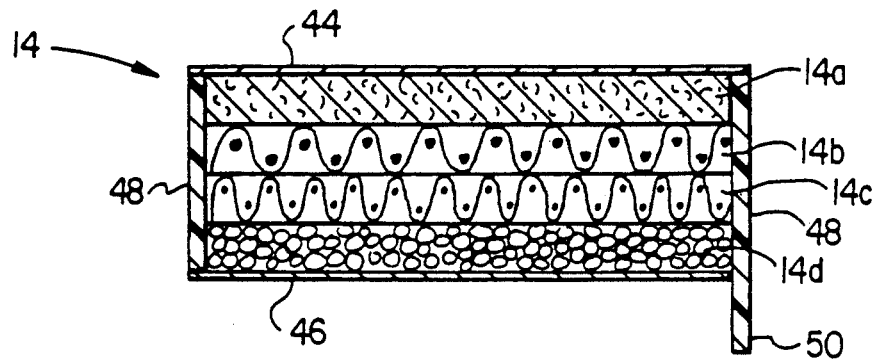
FIG. 3 is a side cross-sectional view of the preferred embodiment of the filter element for the present invention.

The illustration of filter element 14 in FIGS. 1 and 2 is only intended to display the operative relationship between filter element 14, lid 12, and cup 16 and does not depict the actual internal configuration of filter element 14. The preferred embodiment of filter element 14, as shown in FIG. 3, includes four different layers of filtering material 14a–14d confined above and below by screens 44 and 46 and laterally retained by ring 48. It will be clear to one skilled in the art that screens 44 and 46 may be constructed from a variety of porous materials suitable for the purpose, and the degree of filtration provided by screens 44 and 46 may be varied from negligible to substantial depending upon the porosity of the material selected for their construction. In the preferred embodiment of filter element 14, it is not intended for screens 44 and 46 to contribute significantly to the overall filtration, since the filtering material in layers 14a–14d are far superior for this purpose.

The peripheral edges of screens 44 and 46 are secured to the edges of ring 48 by means of a suitable adhesive. Ring 48 is preferably constructed from a suitable plastic material, with its outer diameter such that filter element 14 fits snugly within lip 22 of lid 12. Removal tab 50 is preferably an extension of a small portion of ring 48, and serves to provide a convenient gripping surface to facilitate the removal of filter element 14 from its operative position within lid 12.

As mentioned above, filter element 14 preferably consists of four distinct layers, 14a, 14b, 14c, and 14d. Layer 14a consists of a fine polyester filter fiber which serves to remove the majority of suspended particulate matter from the water being filtered. Layer 14b is an asbestos fiber screen coated with a bactericidal medium, preferably a triiodide resin, with a pore size of approximately 0.20 micron. Layer 14c is also an asbestos screen coated with an additional bactericidal medium, preferably silver nitrate, with a pore size of approximately 0.15 micron. Finally, layer 14d consists of a granular adsorbent material, preferably activated charcoal, for removing unpleasant odor, taste, and certain impurities from the water. The relative positioning of the four layers within filter element 14 is primarily a matter of choice, the organization described above being given by way of example only.

Figure 4:
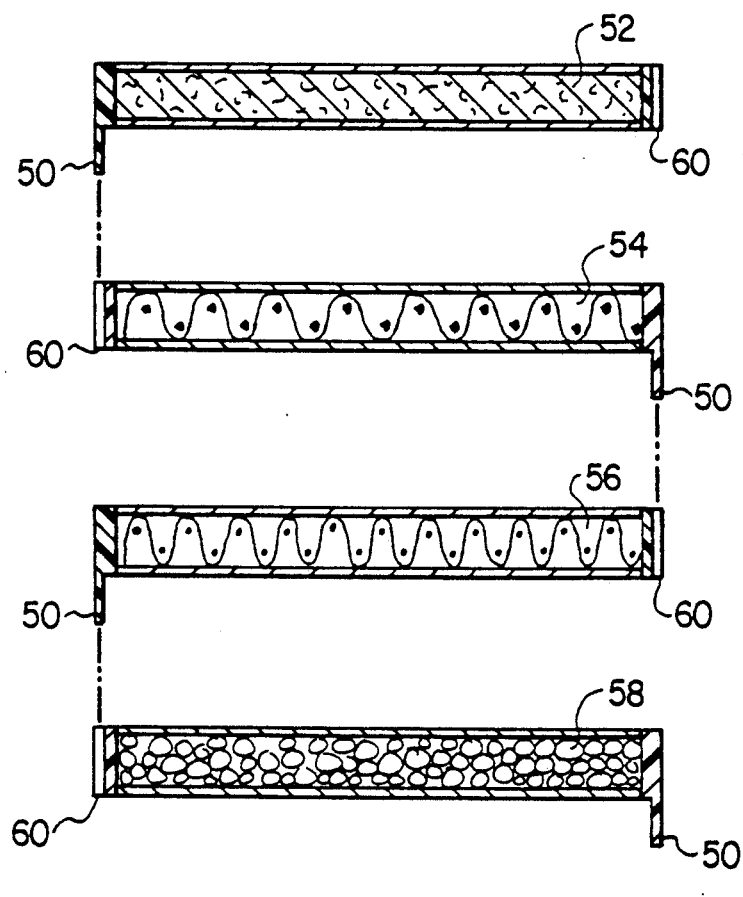
FIG. 4 is a side cross-sectional view of an alternative embodiment for the filter element of the present invention.

It is contemplated that a suitable alternative to the four-layered filtering element 14 would be to provide four individual filter elements, each corresponding to one of the four layers described above. FIG. 4 illustrates such an alternative embodiment, wherein filter elements 52, 54, 56, and 58, correspond with layers 14a, b, c, and d of filter element 14 shown in FIG. 3. The construction of each individual filter element 52-58 is essentially identical to the construction of filter element 14 set forth above, with each filter element 52-58 having its own tab 50 to facilitate removal. In this embodiment, each filter element 52-58 also includes a slot 60 diametrically opposite tab 50 to accommodate the tab of the above-situated filter element.

With the alternative embodiment shown in FIG. 4, the user may select one or more of the filter elements 52-58 depending upon the needs of the particular situation. If, for example, the user of apparatus 10 is confronted with water which is basically clean and bacteria free, but contains a certain amount of particulate matter, the user can install filter element 52 alone, thus preserving filter elements 54, 56, and 58 for future use. It will be understood by those skilled in the art that the exact composition, arrangement, and use of the individual filter elements may be varied as needed without detracting from the improved performance provided by the present invention.

While the principle of disposing a filter element within the lid of a filtering apparatus and providing dual passageways therethrough has been made clear, it will be immediately apparent to those skilled in the art that there are many possible modifications to the disclosed arrangement without departing from the basic spirit of the invention. Accordingly, the following claims are intended to cover and embrace not only the specific embodiment disclosed herein but also such modifications within the spirit and scope of this invention.

What is claimed is:

1. A portable fluid filtering apparatus comprising:
   a lid removably engageable with the rim of a container;
   said lid defining a fluid inlet opening and a fluid discharge opening spaced from said fluid inlet opening;
   filtering means operatively disposed within said lid; and
   barrier means disposed between the top of said filtering means and the bottom of said lid for providing separate flow paths through said filtering means for fluid entering said container through said fluid inlet opening and fluid discharged from said container through said fluid discharge opening.

2. A portable water filtering apparatus according to claim 1, further comprising:
   a drinking cup removably secured to said lid, whereby
   said contaminated water may be poured through said inlet means and passed through said filtering means, thus effecting a first filtering of said contaminated water, and collected within said drinking cup, and
   said contaminated water may then be poured from said drinking cup through said filtering means and directed outwardly through said outlet means, thus effecting a second filtering of said contaminated water.

3. A portable water filtering apparatus according to claim 1, wherein:
   said filtering means comprises a screen-type water filter having at least one layer suitable for removing suspended particulate matter from contaminated water.

4. The apparatus of claim 1 wherein said lid is circular;
   said fluid inlet opening and said fluid discharge opening are diametrically opposed; and
   said barrier means comprises a diametrical depending rib on said lid disposed intermediate said fluid inlet and discharge openings.

5. A portable water filtering apparatus comprising:
   a lid removably engageable with the rim of a drinking cup;
   filtering means operatively disposed within said lid;
   retention means for removably securing said filtering means within said lid, said filtering means and said lid being removable from said cup as a unit;
   inlet means for providing a first passageway through said lid, said passageway being in fluid communication with said filtering means whereby contaminated water may be poured through said inlet means and directed into and through said filtering means;
   outlet means for providing a second passageway through said lid, said second passageway being in fluid communication with said filtering means whereby said contaminated water may pass outwardly through said filtering means and exit through said outlet means; and
   a first compartment disposed between, and in fluid communication with, said inlet means and said filtering means, said first compartment being isolated from said outlet means, wherein
   contaminated water poured through said inlet means collects briefly in said first compartment prior to passing through said filtering means.

6. A portable water filtering apparatus according to claim 5, further comprising:
   a second compartment disposed between, and in fluid communication with, said outlet means and said filtering means, said second compartment being isolated from said inlet means, wherein
   contaminated water passing outwardly through said filtering means collects briefly in said second compartment prior to exiting through said outlet means.

7. A portable water filtering apparatus comprising:
   a drinking cup having an upper rim;
   a lid removably engageable with the upper rim of said drinking cup;
   filtering means operatively disposed within said lid;
   retention means for removably securing said filtering means within said lid such that said filtering means and said lid are removably from said cup as a unit;
   inlet means for providing a first passageway through said lid, said first passageway being in fluid communication with said filtering means whereby contaminated water may be poured through said inlet means and directed into and through said filtering means, the filtered water then being contained within said drinking cup;
   outlet means for providing a second passageway through said lid, said second passageway being in fluid communication with said filtering means whereby said filtered water may be poured from said drinking cup through said filtering means and directed outwardly through said outlet means; and
   a first compartment disposed between, and in fluid communication with, said inlet means and said filtering means, said first compartment being isolated from said outlet means, wherein contaminated water poured through said inlet means collects briefly in said first compartment prior to passing through said filtering means.

8. A portable water filtering apparatus according to claim 7, further comprising:
   a second compartment disposed between, and in fluid communication with, said outlet means and said filtering means, said second compartment being isolated from said inlet means, wherein
   contaminated water passing outwardly through said filtering means collects briefly in said second compartment prior to exiting through said outlet means.

9. A portable water filtering apparatus comprising:
   a lid removably engageable with the rim of a drinking cup;
   filtering means operatively disposed within said lid, said filtering means comprising a water filter having at least one layer suitable for removing suspended particulate matter from contaminated water;

retention means for removably securing said filtering means within said lid, said filtering means and said lid being removable from said cup as a unit;

inlet means for providing a first passageway through said lid, said passageway being in fluid communication with said filtering means whereby said contaminated water may be poured through said inlet means and directed into and through said filtering means;

wherein said water filter includes:

a first layer comprising a polyester fiber screen which operates to remove suspended particulate matter from said contaminated water;

a second layer comprising an asbestos fiber screen coated with triiodide resin, which operates to remove suspended particulate matter from said contaminated water and further to purify said contaminated water by killing bacteria contained therein;

a third layer comprising an asbestos fiber screen coated with silver nitrate, which operates to remove suspended particulate from said contaminated water and further to purify said contaminated water by killing bacteria contained therein; and a fourth layer comprising activated charcoal for removing unpleasant taste and odor from said contaminated water.

* * * * *